Fig. 1

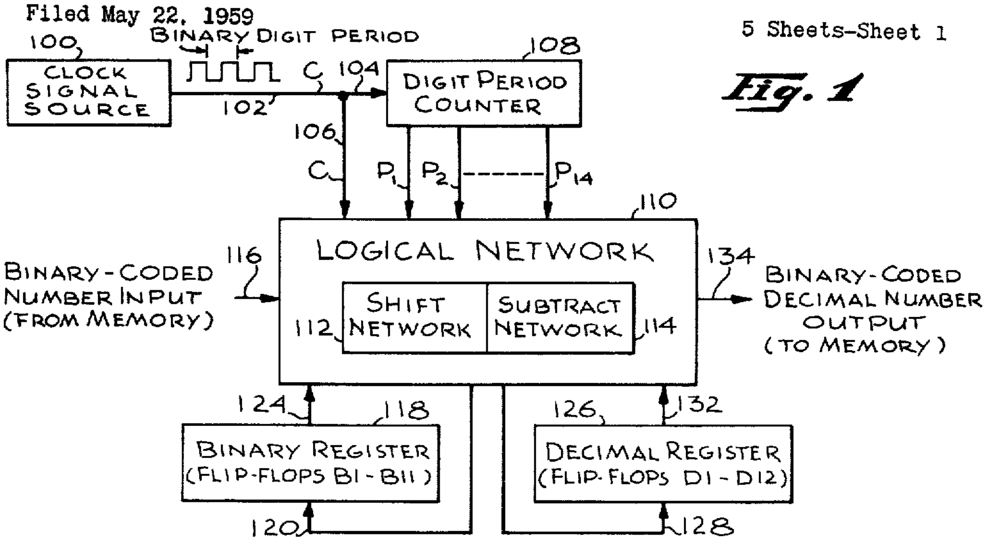

| END OF DIGIT PERIOD | FLIP-FLOPS | ACTIVITY |
|---|---|---|
| PRIOR TO $P_1$ | B10 TO B1<br>B11, D12 TO D1 | RECEIVE BINARY NUMBER TO BE CONVERTED.<br>SET TO 0 |
| $P_1$ TO $P_7$ | B11 TO B9<br>B8 TO B2<br>B1 | TRIGGERED BY CONVERSION LOGIC.<br>ONE-STAGE SHIFT.<br>RECEIVES CONVERSION DECISION. |
| $P_8$ | B11, B3 TO B1<br>B10 TO B4<br>D4 TO D1 | SET TO 0.<br>THREE-STAGE SHIFT.<br>FOLLOW B11 TO B8 |
| $P_9$ TO $P_{12}$ | B11 TO B9<br>B8 TO B2<br>B1 | TRIGGERED BY CONVERSION LOGIC.<br>ONE-STAGE SHIFT.<br>RECEIVES CONVERSION DECISION. |
| $P_{13}$ | B11 TO B1<br>D8 TO D5<br>D12 TO D9 | RESET TO 0 (OR TO NEXT BINARY No.).<br>FOLLOW B11 TO B8 AT $P_{13}$<br>FOLLOW B4 TO B1 AT $P_{13}$ |

Fig. 2

JAMES D. HOGAN
INVENTOR.

BY MORRIS SPECTOR
ARTHUR DECKER
LESTER S. HECHT
ATTORNEYS

March 26, 1963 J. D. HOGAN 3,082,950

RADIX CONVERSION SYSTEM

Filed May 22, 1959 5 Sheets–Sheet 2

| ROWS | Flip-flops of binary register: Before arithmetic operation B11 | B10 | B9 | B8 | After arithmetic operation B11 | B10 | B9 | B8 | B1 | Trigger inputs | | | | | Arithmetic operation |
|---|---|---|---|---|---|---|---|---|---|---|---|---|---|---|---|
| 1 | 0 | 0 | 0 | 0 | 0 | 0 | 0 | Follows flip-flop B7 | 0 | | | | ${}_1b_8$ or ${}_0b_8$ | ${}_0b_1$ | SHIFT |
| 2 | 0 | 0 | 0 | 1 | 0 | 0 | 1 | | 0 | | | ${}_1b_9$ | ${}_1b_8$ or ${}_0b_8$ | ${}_0b_1$ | SHIFT |
| 3 | 0 | 0 | 1 | 0 | 0 | 1 | 0 | | 0 | | ${}_1b_{10}$ | ${}_0b_9$ | ${}_1b_8$ or ${}_0b_8$ | ${}_0b_1$ | SHIFT |
| 4 | 0 | 0 | 1 | 1 | 0 | 1 | 1 | | 0 | | ${}_1b_{10}$ | | ${}_1b_8$ or ${}_0b_8$ | ${}_0b_1$ | SHIFT |
| 5 | 0 | 1 | 0 | 0 | 1 | 0 | 0 | | 0 | ${}_1b_{11}$ | ${}_0b_{10}$ | | ${}_1b_8$ or ${}_0b_8$ | ${}_0b_1$ | SHIFT |
| 6 | 0 | 1 | 0 | 1 | 0 | 0 | 0 | | 1 | | ${}_0b_{10}$ | | ${}_1b_8$ or ${}_0b_8$ | ${}_1b_1$ | SUBTRACT-SHIFT |
| 7 | 0 | 1 | 1 | 0 | 0 | 0 | 1 | | 1 | | ${}_0b_{10}$ | | ${}_1b_8$ or ${}_0b_8$ | ${}_1b_1$ | SUBTRACT-SHIFT |
| 8 | 0 | 1 | 1 | 1 | 0 | 1 | 0 | | 1 | | | ${}_0b_9$ | ${}_1b_8$ or ${}_0b_8$ | ${}_1b_1$ | SUBTRACT-SHIFT |
| 9 | 1 | 0 | 0 | 0 | 0 | 1 | 1 | | 1 | ${}_0b_{11}$ | ${}_1b_{10}$ | ${}_1b_9$ | ${}_1b_8$ or ${}_0b_8$ | ${}_1b_1$ | SUBTRACT-SHIFT |
| 10 | 1 | 0 | 0 | 1 | 1 | 0 | 0 | | 1 | | | | ${}_1b_8$ or ${}_0b_8$ | ${}_1b_1$ | SUBTRACT-SHIFT |
| 11 | 1 | 0 | 1 | 0 | DO NOT OCCUR | | | | | | | | | | |
| 12 | 1 | 0 | 1 | 1 | | | | | | | | | | | |
| 13 | 1 | 1 | 0 | 0 | | | | | | | | | | | |
| 14 | 1 | 1 | 0 | 1 | | | | | | | | | | | |
| 15 | 1 | 1 | 1 | 0 | | | | | | | | | | | |
| 16 | 1 | 1 | 1 | 1 | | | | | | | | | | | |

Fig. 3

JAMES D. HOGAN
INVENTOR.

BY MORRIS SPECTOR
ARTHUR DECKER
LESTER S. HECHT
ATTORNEYS

RADIX CONVERSION SYSTEM

Filed May 22, 1959 5 Sheets-Sheet 3

JAMES D. HOGAN
INVENTOR.

BY MORRIS SPECTOR
ARTHUR DECKER
LESTER S. HECHT
ATTORNEYS

RADIX CONVERSION SYSTEM

Filed May 22, 1959 5 Sheets-Sheet 4

JAMES D. HOGAN
INVENTOR.

BY MORRIS SPECTOR
ARTHUR DECKER
LESTER S. HECHT
ATTORNEYS

| DIGIT PERIODS | B11 | B10 | B9 | B8 | B7 | B6 | B5 | B4 | B3 | B2 | B1 | OPERATION |
|---|---|---|---|---|---|---|---|---|---|---|---|---|
| | | FLIP-FLOPS OF BINARY REGISTER | | | | | | | | | | |
| | | DIVIDEND | | | | | | | | | | |
| $P_1$ | 0 | 1 | 0 | 0 | 1 | 1 | 0 | 1 | 0 | 1 | 1 | SHIFT |
| $P_2$ | 1 | 0 | 0 | 1 | 1 | 0 | 1 | 0 | 1 | 1 | 0 | SUBTRACT-SHIFT |
| $P_3$ | 1 | 0 | 0 | 1 | 0 | 1 | 0 | 1 | 1 | 0 | 1 | SUBTRACT-SHIFT |
| $P_4$ | 1 | 0 | 0 | 0 | 1 | 0 | 1 | 1 | 0 | 1 | 1 | SUBTRACT-SHIFT |
| $P_5$ | 0 | 1 | 1 | 1 | 0 | 1 | 1 | 0 | 1 | 1 | 1 | SUBTRACT-SHIFT |
| $P_6$ | 0 | 1 | 0 | 0 | 1 | 1 | 0 | 1 | 1 | 1 | 1 | SHIFT |
| $P_7$ | 1 | 0 | 0 | 1 | 1 | 0 | 1 | 1 | 1 | 1 | 0 | SUBTRACT-SHIFT |
| | FIRST REMAINDER | | | | FIRST QUOTIENT | | | | | | | |
| $P_8$ | 1 | 0 | 0 | 1 | 0 | 1 | 1 | 1 | 1 | 0 | 1 | TRANSFER; SHIFT 3 STAGES |
| $P_9$ | 0 | 0 | 1 | 1 | 1 | 1 | 0 | 1 | 0 | 0 | 0 | SHIFT |
| $P_{10}$ | 0 | 1 | 1 | 1 | 1 | 0 | 1 | 0 | 0 | 0 | 0 | SUBTRACT-SHIFT |
| $P_{11}$ | 0 | 1 | 0 | 1 | 0 | 1 | 0 | 0 | 0 | 0 | 1 | SUBTRACT-SHIFT |
| $P_{12}$ | 0 | 0 | 0 | 0 | 1 | 0 | 0 | 0 | 0 | 1 | 1 | SHIFT |
| | SECOND REMAINDER | | | | | | | THIRD REMAINDER | | | | |
| $P_{13}$ | 0 | 0 | 0 | 1 | 0 | 0 | 0 | 0 | 1 | 1 | 0 | TRANSFER |
| $P_{14}$ | 0 | 0 | 0 | 0 | 0 | 0 | 0 | 0 | 0 | 0 | 0 | RESET |

Fig. 6

| DIGIT PERIODS | D12 | D11 | D10 | D9 | D8 | D7 | D6 | D5 | D4 | D3 | D2 | D1 |
|---|---|---|---|---|---|---|---|---|---|---|---|---|
| | FLIP-FLOPS OF DECIMAL REGISTER | | | | | | | | | | | |
| $P_{1-8}$ | 0 | 0 | 0 | 0 | 0 | 0 | 0 | 0 | 0 | 0 | 0 | 0 |
| | | | | | | | | | FROM B11-B8 AT $P_8$ | | | |
| $P_{9-13}$ | 0 | 0 | 0 | 0 | 0 | 0 | 0 | 0 | 1 | 0 | 0 | 1 |
| | FROM B4-B1 AT $P_{13}$ | | | | FROM B11-B8 AT $P_{13}$ | | | | | | | |
| $P_{14}$ | 0 | 1 | 1 | 0 | 0 | 0 | 0 | 1 | 1 | 0 | 0 | 1 |

Fig. 7

JAMES D. HOGAN
INVENTOR.

BY MORRIS SPECTOR
ARTHUR DECKER
LESTER S. HECHT
ATTORNEYS

United States Patent Office 3,082,950

Patented Mar. 26, 1963

3,082,950

RADIX CONVERSION SYSTEM

James D. Hogan, Rolling Hills, Calif., assignor to Thompson Ramo Wooldridge Inc., Los Angeles, Calif., a corporation of Ohio Filed May 22, 1959, Ser. No. 815,059
5 Claims. (Cl. 235—155)

This invention relates to apparatus for translation between codes of number representation and, more particularly, to equipment integrable with an electronic digital computer and capable of enabling the computer to convert the representation of a number from binary form to binary-coded decimal form.

In many cases where a binary computer is employed, it is preferable to represent input and output data in the decimal form. As a consequence, facility must be provided for converting numbers between the binary and decimal representations. In mathematical theory, the conversion may be quite simple; however the structure which it is found necessary to employ may be considerable, and the problems of sequencing components to perform the conversion properly may be very complex.

This complexity has been ascribed in the past as one of the reasons why it has been considered inappropriate to provide, for such translation, a "program," usually comprising a prescribed sequence of elemental operations for the computer to accomplish. By means of the program, the computer would be enabled to access from its memory the binary number to be converted, perform the conversion to the binary-coded decimal form, and return the resulting binary-coded decimal number to its memory in anticipation of reading it out for presentation by output equipment or for some other purpose. It has previously been thought that such a program would reduce considerably the availability of the computer for other operations.

It will be shown here that it is quite expeditious to use a computer itself for the conversion, as evidenced by the fact that the present invention will be exemplified by the conversion of a binary number of magnitude typical of numbers handled by computers, to its binary-coded decimal equivalent, in but 14 "digit periods" (as hereinafter defined) of computer operation.

Several mathematical procedures for conversion have been adapted in the prior art to digital computer equipment. The particular procedure is usually selected with regard to the characteristics of the computer into which it is to be integrated. The technique which the present invention utilizes as a basis involves repeated division of a number expressed in one radix by the radix of the system into which conversion is desired. For conversion of a binary number into the binary-coded decimal form, for instance, in which the divisor is decimal 10 (binary 1010), the remainder obtained after each division operation indicates a decimal digit, the least significant decimal digit being obtained first and the remaining digits of the decimal number being obtained in order of their significance, the most significant decimal digit being obtained last. The dividend for the first division comprises the binary number to be converted, while subsequent dividends comprise the successive binary quotients. The divisions are repeated until a quotient is obtained which is less than binary 1010; this last quotient is the most significant decimal digit of the binary-coded decimal number.

The present invention contemplates the integration of the above conversion technique into a computer of the general purpose type capable of storing numbers as combinations of "true" and "false" states in a set of bistable-state circuits such as flip-flops, as a bistate magnetic recording on a magnetizable surface, or as some other well-known form of binary representation, and involves the sequential operation of computer structure including pulse sources, "and" gates, "or" gates, etc. Very generally, the converter of the present invention may be regarded as comprised of flip-flops, a source of clock signals for synchronization, counters and an associated "logical" network capable of controlling the operation of the combination of components to be described.

It is an object of this invention to provide a converter, i.e., a radix translation means, integrable in a digital computer.

It is a further object of this invention to provide such a converter characterized by high speed of operation and high efficiency in the use of components, as well as by the requirement of a minimum number of components.

It is a specific object of the invention to provide a converter for translation of number representation from a binary form to a binary-coded decimal form, appropriate for inclusion as part of a computer or as independent equipment.

Other objects and advantages of the invention will be apparent to those skilled in the art from the following description and the attached drawings, in which:

FIGURE 1 is a block diagram of the arrangement of the preferred embodiment of the invention;

FIGURE 2 is a sequential digit period table of computer operation for the conversion of the invention;

FIGURE 3 is a table from which the Boolean equations governing the computer operation during periods $P_{1-7}$ and $P_{9-12}$ may be derived;

Figure 4:
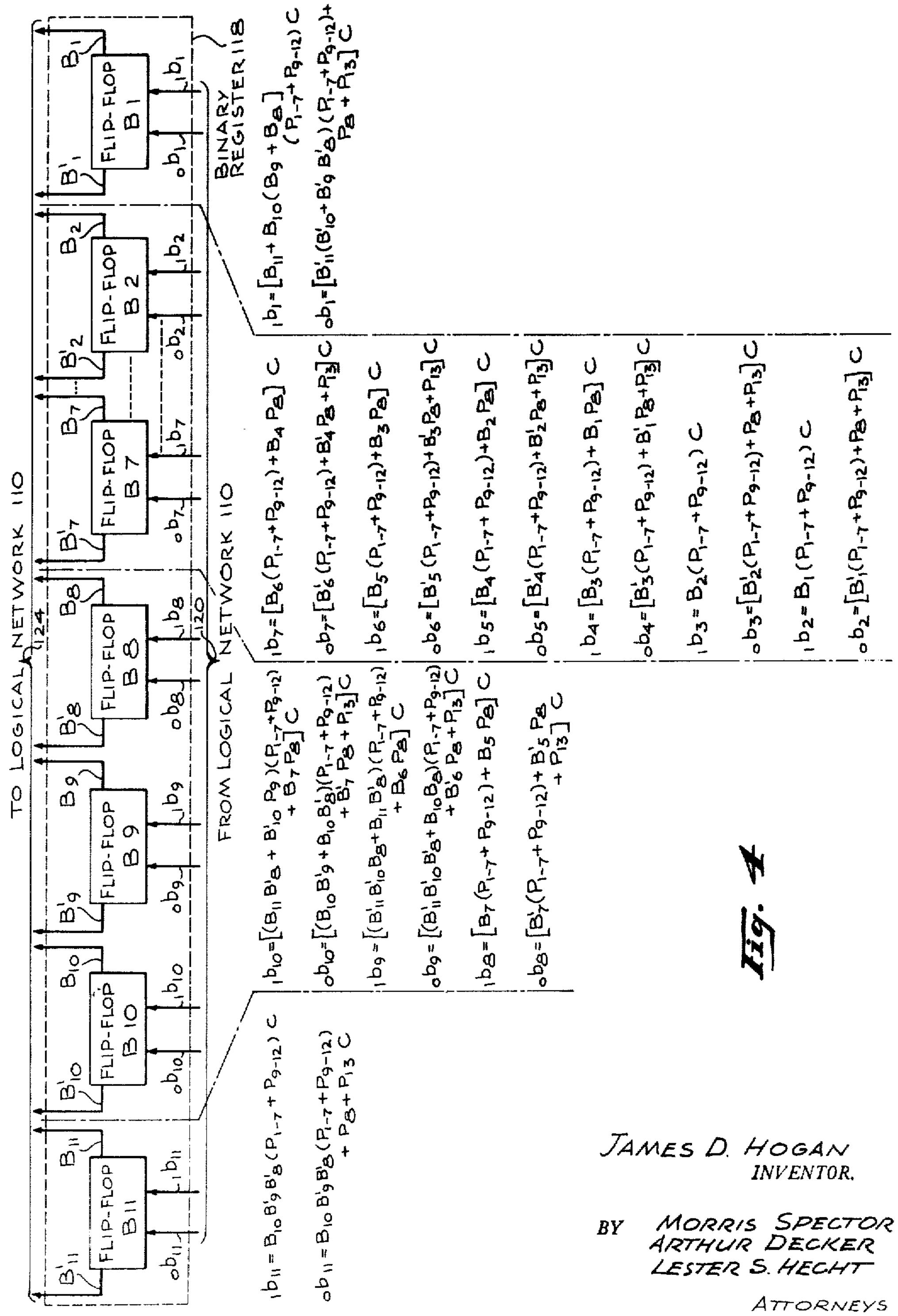
Figure 5:
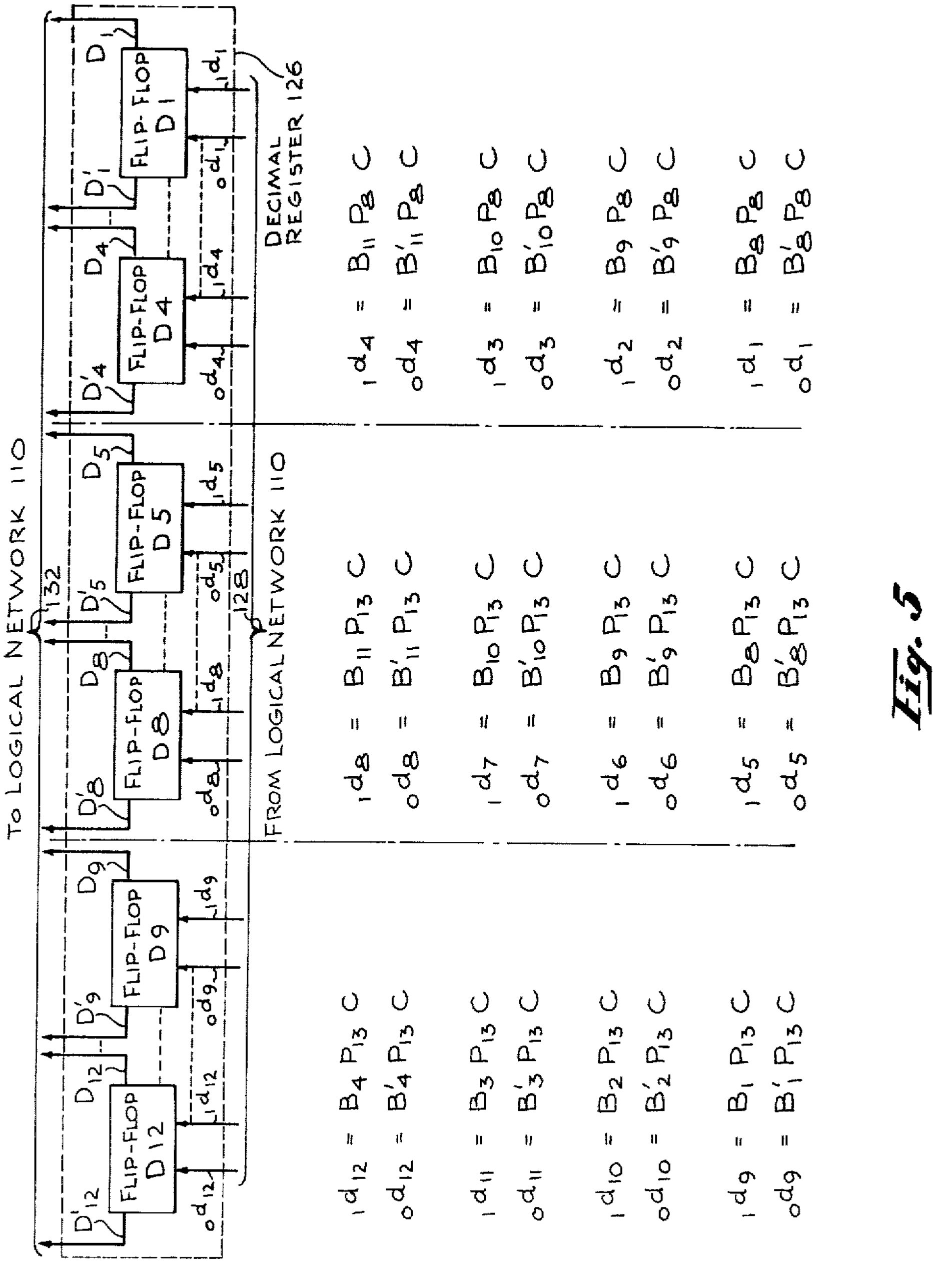

FIGURES 4 and 5 show the block diagrams and Boolean equations for the flip-flops of the binary register and the decimal register, respectively; and, FIGURES 6 and 7 are tables illustrating the states of the flip-flops of the binary register and the decimal register, respectively, for an example of the conversion of the decimal number 619 from binary-coded form to binary-coded decimal form.

According to the invention, conversion from binary representation to binary-coded decimal representation in accordance with the mathematical system outlined above is performed in sequential steps by computer components as follows.

A register having a plurality of stages each capable of storing a binary digit, is set up with its stages to correspond to a binary number to be converted, the number being received from the computer memory or some other source. The number of stages in the register is one more than the number of binary digits comprising the number to be converted and the extra stage is initially set to store a binary zero. The register is arranged to respond to a shift network which, when activated, can operate to shift the digits of the register one stage in the direction of more significance for the digits, the extra stage being filled from the stage priorly containing the digit of the number having most significance. The register is also arranged to respond to a subtract network simultaneously with its response to the shift network, which, when activated, reduces the value of the four most significant stages of the register by binary 0101 simultaneously with the shift. The subtract network is activated in accordance with a decision based on a determination of the magnitude of the combined binary digits content of the four most significant stages relative to binary 0101.

This determination is actually made by comparing the three most significant stages of the register (excluding the extra stage) with binary 101; this is equivalent to comparing the four most significant digits of the binary number to binary 1010 as a first step in a division by binary 1010. The reason that this may be done without affecting the numerical result of any arithmetic operation is that the divisor, binary 1010, has a 0 as the least significant digit and this 0 may be disregarded, i.e., divided by decimal 2 in a binary system arithmetic if, effectively, other operands are also so divided.

In the preferred embodiment, sequential operations occur in equal time intervals, designated "digit periods," and if, during a digit period, the result of the determination is that the combined value of the four register stages is equal to or larger than binary 0101, the subtract network is activated to reduce the value by binary 0101 and the shift network is simultaneously activated to set up the difference in the four most significant stages of the register and to shift the information in all other stages one stage toward more significance. If the determination is that the combined value of the four register stages is less than binary 0101, the shift network is activated merely to shift the information in all stages one stage toward more significance. When ever a simultaneous subtract and shift operation is performed, the least significant register stage is set to store a binary one; whenever a shift operation only is performed, this stage is set to store a binary zero.

This sequence is repeated for a number of digit periods as needed to shift all digits of the number to be converted into the register stages which are affected by the subtract network, to examine, and to perform the described arithmetic if required by the most significant four stages of the register. At this time, the register will be found to contain, in its most significant four stages, the least significant decimal digit of the sought number in binary-coded decimal form (designated as the first remainder), and, in the remaining stages, the more significant decimal digits of the sought number in binary form (designated as the first quotient). During subsequent digit periods, the first remainder is transferred to an auxiliary storage and the first quotient is shifted in the register for treatment as though it were, in the first instance, a number to be converted. The entire process is continued, thereby sequentially generating remainders, comprising binary-coded decimal digits, which are transferred to the auxiliary storage, until a quotient is obtained which is identified as less than binary 0101. This quotient is the last remainder and comprises the binary-coded decimal representation of the most significant decimal digit of the converted number. This also is transferred to the auxiliary storage and the conversion is complete. The decimal number may then be transferred back to the computer memory or to read-out equipment or otherwise.

Before going into a description of the details of the circuitry of the invention, the convention employed herein for nomenclature will be explained.

The circuits of the invention are used to perform logical operations ("and," "or," etc.) and are represented in the form of equations shown in Boolean notation.

The terms of the equations will be mechanized in the circuits by output signals from flip-flops, which are electronic devices having two possible steady state conditions. One of these conditions is referred to as "true" and the other condition is referred to as "false"; when a flip-flop is described as being true, it will be understood to be storing a binary digit 1, and when it is described as false, it will be understood to be storing a binary digit 0.

The flip-flops are characterized by two inputs, only one of which may have an actuating signal at a time, and two outputs having complementary signals. Input signals to the flip-flop are supplied by gating networks and output signals from the flip-flop are supplied to gating networks. It is the operation of these networks which will be described by means of the Boolean equations, each of which thus defines the triggering of a flip-flop. The terms of the equation correspond to flip-flop output signals and the equation represents the generation of a flip-flop input signal during a digit period, the flip-flop triggering actually occurring at the end of the digit period, so that the flip-flop is in the desired state during the next digit period.

The nomenclature used for the present invention employs combinations of letters and numbers for designating the terms of the equations. The flip-flops themselves are designated by combinations of capital letters and numbers; thus, flip-flops B1, D3, etc. One output signal of the flip-flop is characterized by corresponding capital letters with the associated number shown as a subscript; thus, signals $B_1$, $D_3$, etc. In order to distinguish the complementary output of the flip-flop, it is accompanied by an affixed prime; thus, signals $B_1'$, $D_3'$, etc. It will be understood that the output signals partake of a pair of voltage levels, such as +10 volts and 0 volts, on a line, and, when the unprimed signal output of a flip-flop is high in voltage and the primed signal output is low in voltage, the flip-flop is true, while, for the reverse condition, the flip-flop is false; thus, flip-flop B1 is true when signal $B_1$ is at +10 volts and signal $B_1'$ is at 0 volts.

On the other hand, the signals to the flip-flops are designated by corresponding lower case letters with the associated number shown as a subscript. The input signal for rendering the flip-flop true is designated by a subscript 1 prefixing the lower case letter; thus, signals ${}_1b_1$, ${}_1d_3$, etc. The input signal for rendering the flip-flop false is designated by a subscript 0 prefixing the lower case letter; thus, signals ${}_0b_1$, ${}_0d_3$, etc.

Although the inventive concept is quite applicable to other systems of representing information in a computer, it will be presented herein with regard to a synchronized pulse system. By this is meant a system in which repetitive pulses, whether information-representing, or "clock" signals, or otherwise, are synchronized to occur at particular time intervals with reference to each other. In such as system, signals may be of square waveshape alternating between the aforementioned levels, as, for instance, +10 volts and zero volts (ground potential) present on a line; and it is most convenient to regard synchronization as being provided by clock signals of symmetrical square waveshape generated by a pulse generator, which may comprise a repetitive magnetic recording associated with a sensing electromagnetic transducer and pulse shaping circuitry, or a frequency-controlled square wave generator, or other appropriate means. Synchronization by such means implies that the potential of a line may change between the levels of +10 volts and zero volts only at the time of the trailing edge of the clock signal pulse, the time between trailing edges being designated as a "binary digit period" or "digit period."

FIGURE 1 is a block diagram of the arrangement of the preferred embodiment of the invention, which, in the present specification, contemplates the conversion of a 10-digit binary-coded number having a value less than decimal 1000 into its 12-digit binary-coded decimal equivalent.

The converter comprises logical network 110 operative to cooperate with a pair of registers, binary register 118 and decimal register 126, together with equipment to provide for entering information into, removing information from, and sequencing the operation of this combination. For facilitating explanation, special indication has been made for portions of logical network 110, namely, shift network 112 and subtract network 114.

The aforementioned binary digit periods are established by clock signal source 100 which emits symmetrical square wave signals C on lines 102, 104 and 106; these lines provide signal C input to digit period counter 108 and logical network 110, respectively.

The function of digit period counter 108 is to count clock signals C and to generate sequential and cyclical signals $P_1$ through $P_{14}$ on output lines as required for the conversion of a 10-digit binary number; only one of the output lines from counter 108 may be at the high potential (+10 volts) at a time. Counter 108 responds to 14 sequential clock signals C and then recycles; thus, by noting the output of counter 108, succeeding binary digit periods may be identified. Such counters are well known to be capable of providing the basic timing sequence which controls the activation of appropriate computer portions, such as logical network 110 in the present case. Logical network 110 includes shift network 112 and subtract network 114, each of which is activated, as will be detailed, at particular digit periods in the sequence $P_1$ through $P_{14}$, in order to accomplish the conversion to be described.

Logical network 110 also serves to route information in a manner appropriate to perform the desired conversion. Thus, the binary number to be converted is transferred from, for instance, the computer memory, via line 116 to logical network 110 and thence by line 120 to binary register 118 where it is set up in flip-flops B1 through B11. The number is arithmetically handled by shift network 112 and subtract network 114 also via line 120 and fed back to logical network 110 as a binary-coded decimal number one decimal order (i.e., 4 binary digits) at a time through line 124. Logical network 110 transmits the converted number to decimal register 126 on line 128 where it is set up in flip-flops D1 through D12 as instructed by logical network 110. When the conversion is completed, decimal register 126 is filled; at this time it is instructed by logical network 110 to transfer the converted number via lines 132 and 134 to the computer memory or to output equipment.

The aforementioned activity is detailed in FIGURE 2 with regard to the sequential digit periods $P_1$ and $P_{14}$; consequently, FIGURE 2 may be considered to comprise a presentation of the "flow diagram" of computer operation for the conversion of the invention. As indicated under the column headed "activity," prior to period $P_1$, logical network 110 (FIGURE 1) arranges for the incoming binary numbers to be set up in flip-flops B10 through B1 of binary register 118; this is done with the most significant digit of the incoming number in flip-flop B10 and the least significant digit in flip-flop B1. Flip-flop B11 is set false as are all of the flip-flops of decimal register 126. Techniques for these operations are well known and are not considered as inherent in the conversion of the invention; therefore, logical equations and networks corresponding thereto will not be shown nor described here.

During the time interval from the end of period $P_1$ through the end of period $P_7$ (designated briefly as period $P_{1-7}$) the components of FIGURE 1 commence the conversion by performing a repetitive division of the content of binary register 118 by binary 0101 to formulate, during period $P_8$, a first binary-coded decimal remainder in flip-flops B11 through B8 and a first quotient in flip-flops B7 through B1.

The method of the conversion logic will be explained by reference to FIGURE 3, which indicates the four most significant stages, flip-flops B11 through B8, of binary register 118 for all possible combinations of binary numbers to be converted; this is shown in the four columns headed "before arithmetic operation." As previously indicated, the scheme of the invention examines the three most significant digits of the incoming binary number for magnitude relative to binary 101 by actually comparing the four most significant stages of binary register 118 (the content of flip-flops B11 through B8) with binary 0101. If the examination shows that the combined content of these stages is less than binary 0101, the content of binary register 118 is shifted by shift network 112 one stage toward greater significance (i.e. flip-flop B11 "follows" flip-flop B10, flip-flop B10 "follows" flip-flop B9, etc.), and flip-flop B1 is set false; however, if the examination shows that the combined content of these stages is equal to or greater than binary 0101, a "subtract-shift" operation, designating the cooperation of shift network 112 and subtract network 114, is performed, thereby reducing the combined value of these stages by binary 0101 simultaneous with a shift of one stage toward greater significance, and flip-flop B1 is set true. Accordingly, all possible combinations of flip-flops B11 through B8 are given in the respective columns of FIGURE 2 included in the portion labeled "before arithmetic operation."

The combinations of rows 1 through 5 are less than binary 0101 and thus a single stage shift is required, thereby establishing the corresponding flip-flop states shown in the portion of the table labeled "after arithmetic operation." Comparison of these portions and the observance of the aforesaid rule for flip-flop B1 indicates the necessity for generating, for these rows, the flip-flop input signals designated in the column headed "trigger inputs."

On the other hand, the combination of row 6 is equal to binary 0101 and the combinations of rows 7 through 10 are greater than binary 0101, and thus the arithmetic operation required is a subtract-shift. In order to establish the corresponding states shown in the "after arithmetic operation" portion, in which the states of flip-flops B11, B10 and B9 represent the difference between the states of flip-flops B10, B9 and B8 shown in the "before arithmetic operation" portion and binary 0101, the flip-flop input signals designated for rows 6 through 10 must be generated.

It is noted in FIGURE 3 that the combinations of rows 11 through 16 do not occur. This is because the difference (the remainder) between binary 0101 (the divisor) and each of these combinations (the dividend) equals or exceeds binary 0101 (the divisor), and this situation cannot occur in a division process. Therefore, rows 11 through 16 may be disregarded in deriving the conversion logic.

In brief, the conversion logic is established by comparing the states of each flip-flop in the "before arithmetic operation" and "after arithmetic operation" portions of the table of FIGURE 3, and generating a corresponding input signal for the flip-flops which change state. For example, consider flip-flop B11, which is shown to change from false to true in row 5 and is shown to change from true to false in row 9. For row 5, flip-flops B11, B10, B9 and B8 are storing 0, 1, 0, 0, respectively; the appropriate Boolean equation for flip-flop B11, for period $P_{1-7}$ is accordingly $$_1b_{11}=B_{11}'B_{10}B_9'B_8'P_{1-7}C$$

For row 9, flip-flops B11, B10, B9 and B8 are storing 1, 0, 0, 0 respectively; the appropriate Boolean equation for flip-flop B11, for period $P_{1-7}$ is accordingly $$_0b_{11}=B_{11}B_{10}'B_9'B_8'P_{1-7}C$$

Logical manipulation of these equations permits simplification to $$_1b_{11}=B_{10}B_9'B_8'P_{1-7}C$$

and $$_0b_{11}=B_{11}B_8'P_{1-7}C$$

FIGURES 4 and 5 present diagrams of binary register 118 and decimal register 126, respectively, in the convention to be employed herein for showing flip-flops and their inputs and outputs, and a compilation of the Boolean equations governing their operation. Each flip-flop is shown in block diagram labelled with its designation, and its complementary outputs and its inputs are each shown on a pair of lines indicated by the symbols previously discussed. In FIGURE 4, the inputs and outputs of binary register 118 are connected to gates of logical network 110 by way of lines 120 and 124, respectively and, in FIGURE 5, the inputs and outputs of decimal register 126 are connected to gates of logical network 110 by way of lines 128 and 132, respectively. Dashed lines are used to separate the registers into groups of flip-flops which are generally caused to operate similarly by the gates as evidenced by their corresponding equations.

The form of the equations will be explained by considering flip-flop B11 of FIGURE 4 as an example; the Boolean equation representing triggering to the true state (storage of a digit 1) is given as $$_1b_{11}=B_{10}B_9'B_8'(P_{1-7}+P_{9-12})C$$

which signifies that flip-flop B11 will be triggered true at the trailing edge of each clock pulse signal C ending the periods $P_1$ through $P_7$ or $P_9$ through $P_{12}$ if outputs $B_{10}$, $B_9'$ and $B_8'$ from flip-flops B10, B9 and B8 respectively, are simultaneously at +10 volts. It should be obvious to those skilled in the art that signal $_1b_{11}$ may be generated by well known gates of the "and" and "or" types; an expression such as $(B_{10}B_9'B_8)$ may be generated by an "and" gate while an expression such as $(P_{1-7}+P_{9-12})$ may be generated by an "or" gate.

The following equations are derived for period $P_{1-7}$ from FIGURE 3 for the other flip-flops involved:

$$_1b_{10}=(B_{11}B_8'+B_{10}'B_9')P_{1-7}C$$
$$_0b_{10}=B_{10}(B_9'+B_8')P_{1-7}C$$
$$_1b_9=(B_{11}'B_{10}'B_8+B_{11}B_8')P_{1-7}C$$
$$_0b_9=(B_{11}'B_{10}B_8'+B_{10}B_8)P_{1-7}C$$
$$_1b_8=B_7P_{1-7}C$$
$$_0b_8=B_7'P_{1-7}C$$
$$_1b_1=[B_{11}+B_{10}(B_9+B_8)]P_{1-7}C$$
$$_0b_1=B_{11}'(B_{10}'+B_9'B_8')P_{1-7}C$$

It will be noted that, regardless of the arithmetic operation performed, flip-flop B8 "follows" flip-flop B7, i.e., flip-flop B8 is triggered at the end of a digit period into the state characterizing flip-flop B7 during that digit period. Since, for all rows of the table of FIGURE 3, the state of flip-flop B7 during a digit period may be either true or false depending on the binary number to be converted, provision must be made for generating both input signals to flip-flop B8, although, as already indicated, only one of the inputs will be effective to trigger flip-flop B8 at the end of any one digit period.

Returning to FIGURE 2 and continuing with the discussion of the flow diagram there shown, it can now be appreciated that, at the end of period $P_7$, there has been completed the first division operation in the conversion of the binary number to binary-coded decimal form.

At the end of period $P_8$, it is desired that the first remainder be transferred from flip-flops B11 through B8 of binary register 118 to flip-flops D4 through D1 of decimal register 126, and, that binary register 118 be set up for a further division operation.

The transfer of the first remainder is accomplished by logical network 110 as represented by the following Boolean expresisons:

$$_1d_4=B_{11}P_8C$$
$$_0d_4=B_{11}'P_8C$$
$$_1d_3=B_{10}P_8C$$
$$_0d_3=B_{10}'P_8C$$
$$_1d_2=B_9P_8C$$
$$_0d_2=B_9'P_8C$$
$$_1d_1=B_8P_8C$$
$$_0d_1=B_8'P_8C$$

As previously explained with regard to the activity of flip-flop B8 at the end of period $P_{2-7}$, the effect of the above equations is to provide that flip-flop D4 follow flip-flop B11, flip-flop D3 folow flip-flop B10, etc.

Activity within binary register 114 with regard to the transfer of the first quotient from flip-flops B7 through B1 to flip-flops B10 through B4 and setting flip-flops B11, B3, B2 and B1 false, is similar in that the three-stage shift required is controlled by logical network 110 according to the following expressions to provide that flip-flops B10 through B4 follow flip-flops B7 through B1, respectively:

$$_1b_{10}=B_7P_8C$$
$$_0b_{10}=B_7'P_8C$$
$$_1b_9=B_6P_8C$$
$$_0b_9=B_6'P_8C$$
$$_1b_8=B_5P_8C$$
$$_0b_8=B_5'P_8C$$
$$_1b_7=B_4P_8C$$
$$_0b_7=B_4'P_8C$$
$$_1b_6=B_3P_8C$$
$$_0b_6=B_3'P_8C$$

$$_1b_5=B_2P_8C$$
$$_0b_5=B_2'P_8C$$
$$_1b_4=B_1P_8C$$
$$_0b_4=B_1'P_8C$$

In order to enable logical network 110 to operate on the first quotient exactly as described for the original binary number, flipflops B11, B3, B2, and B1 are set false at the end of period $P_8$:

$$_0b_{11}=P_8C$$
$$_0b_3=P_8C$$
$$_0b_2=P_8C$$
$$_0b_1=P_8C$$

Thus, at period $P_9$, the system is ready to continue the conversion. However, since the last three binary digits, (i.e., the content of flip-flops B3, B2 and B1) of the new dividend (first quotient) are not significant, it should be apparent that four digit periods suffice to complete the conversion for a ten-digit binary number having a value less than decimal 1000. Therefore, logical network 110 controls the process during period $P_{9-12}$ in accordance with the same expressions derived previously for period $P_{1-7}$; accordingly, the activity in FIGURE 2 for period $P_{9-12}$ corresponds to that of period $P_{1-7}$ and will not again be described.

As the result, at the end of period $P_{12}$ (during period $P_{13}$) the conversion is complete and the binary-coded decimal number is located with its least significant digit (first remainder) in flip-flops D4 through D1, its digit of next significance (second remainder) in flip-flops B11 through B8 and its most significant digit (third remainder) in flip-flops B4 through B1.

It is the object of period $P_{13}$ to permit the transfer of the binary-coded decimal digits in binary register 118 to decimal register 126 in relative positions contemplating a later transfer to computer readout equipment or a return to the computer memory, and to reset all stages of binary register 118 false or to the next binary number to be converted. The transfer is accomplished by logical network 118 in accordance with the following:

$$_1d_{12}=B_4P_{13}C$$
$$_0d_{12}=B_4'P_{13}C$$
$$_1d_{11}=B_3P_{13}C$$
$$_0d_{11}=B_3'P_{13}C$$
$$_1d_{10}=B_2P_{13}C$$
$$_0d_{10}=B_2'P_{13}C$$
$$_1d_9=B_1P_{13}C$$
$$_0d_9=B_1'P_{13}C$$
$$_1d_8=B_{11}P_{13}C$$
$$_0d_8=B_{11}'P_{13}C$$
$$_1d_7=B_{10}P_{13}C$$
$$_0d_7=B_{10}'P_{13}C$$
$$_1d_6=B_9P_{13}C$$
$$_0d_6=P_9'P_{13}C$$
$$_1d_5=P_8P_{13}C$$
$$_0d_5=B_8'P_{13}C$$

For illustration here, reset of binary register 118 to zero will be shown. This function is accomplished as represented by the following expressions:

$$_0b_{11}=P_{13}C$$
$$_0b_{10}=P_{13}C$$
$$_0b_9=P_{13}C$$
$$_0b_8=P_{13}C$$
$$_0b_7=P_{13}C$$
$$_0b_6=P_{13}C$$
$$_0b_5=P_{13}C$$
$$_0b_4=P_{13}C$$
$$_0b_3=P_{13}C$$
$$_0b_2=P_{13}C$$
$$_0b_1=P_{13}C$$

It has been pointed out that logical network 110 comprises a combination of gates capable of controlling the sequential operation of the converter system of the invention as well as capable of generating the system signals represented by the Boolean expressions in FIGURES 4 and 5. Many techniques are known in the computer art which teach how such gates may be constructed; it should suffice here to point out that the selection is determined by the particular computer design with respect to component structure, logical voltage levels, etc., and in no way is contemplated to affect the essence of this invention.

The converter system will further be described with reference to the flow diagram of FIGURE 2 and the tables of FIGURES 6 and 7, which involve the conversion of the decimal number 619 from binary form (1001101011) to binary-coded decimal form (0110 0001 1001).

By period $P_1$, the binary number to be converted is received by logical network 110 and set up in binary register 118, its most significant binary digit in flip-flop B10 and its least significant binary digit in flip-flop B1, and flip-flop B11 and the flip-flops of decimal register 126 are set false. The period $P_1$ row of FIGURE 6 and the period $P_{1-8}$ row of FIGURE 7 indicate the respective registers at these times.

In period $P_1$, flip-flops B11, B10, B9 and B8 are examined and since their combined value, binary 0100, is less than binary 0101, a one-stage shift occurs in binary register 118 so that, at the end of period $P_1$, the original binary number is set up in flip-flops B11 through B2 and flip-flop B1 is set false. In the table of FIGURE 6, the arrow from flip-flop B1 at period $P_1$ to flip-flop B2 at period $P_2$ is intended to indicate this shift. Subsequent shifts will be similarly indicated.

In period $P_2$, it is seen that the combined content, binary 1001, of flip-flops B11 through B8, exceeds binary 0101. Consequently, the activity at the end of period $P_2$ is a subtract-shift, which computes the difference between these values, binary 100, and this is entered into flip-flops B11 through B9. The rest of binary register 118 is also shifted; flip-flop B8 receives the digit 1 previously stored in flip-flop B7 and flip-flop B1 is set true.

The sequence continues in this fashion until, in period $P_8$, the first remainder, binary 1001 (decimal 9) is stored in flip-flops B11 through B8 and the first quotient, binary 0111101 (decimal 61) is stored in flip-flops B7 through B1. The first division operation has now been completed.

At the end of period $P_8$, the portion of logical network 110 which provides for input triggering of flip-flops D4 through D1 is effective to transfer the binary 1001 from flip-flops B11 through B8 to flip-flops D4 through D1, where it is set up as shown in FIGURE 7 for period $P_{9-13}$. Also, flip-flops B11, B3, B2 and B1 are set false and a three-stage shift is performed in the other flip-flops of binary register 118, which appears, as for period $P_9$, in FIGURE 6. For period $P_{9-12}$, logical network 110 operates as for period $P_{1-7}$ to develop, for period $P_{13}$, the second remainder, binary 0001 (decimal 1), in flip-flops B11 through B8, and a second quotient, binary 0000110, in flip-flops B7 through B1. The last four binary digits, (binary 0110), of the second quotient, residing in flip-flops B4 through B1, comprise the third remainder, decimal 6, of the full quotient of the conversion.

During period $P_{13}$, then, the conversion process is complete, with the following results: the most significant decimal digit (decimal 6) of the converted number (decimal 619) is stored in binary-coded decimal form in flip-flops B4 through B1, the decimal digit of next significance (decimal 1) is stored in binary-coded decimal form in flip-flops B11 through B8, and the least significant decimal digit (decimal 9) is stored in binary-coded form in flip-flops D4 through D1.

At the end of period $P_{13}$, the content of flip-flops B4 through B1 is transferred to flip-flops D12 through D9 and the content of flip-flops B11 through B8 is transferred to flip-flops D8 through D5. Also, at the end of period $P_{13}$, all flip-flops of binary register 118 are reset false. As a result, during period $P_{14}$, the entire converted binary-coded decimal number, 0110, 0001 1001 (decimal 619), is stored in decimal register 126, and all flip-flops of binary register 118 are storing binary zeros.

It should be obvious that, where numbers having a greater number of digits are to be converted, additional storage in the registers must be provided. Although the registers have been shown here in flip-flop form, the recirculating line types presently well known could also be used within the concept of the invention, and these may easily be made to operate sequentially by the logic in this system. Either method of storage could be extended for any number of digits in a binary number to be converted or any number of digits in the converted binary-coded decimal number. It should also be obvious that additional time periods of computer operation may be devoted to the conversion system where larger numbers are to be handled.

It should be further apparent, especially from FIGURE 6, that, if binary register 118 were increased in capacity by one flip-flop, four stages would be available at all digit periods subsequent to period $P_8$. In the present embodiment, flip-flops B3, B2 and B1 are available at period $P_9$, flip-flops B4 through B1 are available at period $P_{10}$, flip-flops B5 through B2 are available at period $P_{11}$, etc. It follows that an increase of capacity of binary register 118 by one flip-flop could thereby permit continuous storage of the developed binary-coded decimal digits in binary register 118 as the conversion proceeds. At the completion of the conversion, then, the binary-coded number would be set up in binary register 118 and it would be possible to simultaneously transfer all binary-coded decimal digits to the computer memory, output equipment or otherwise.

In summary, the invention is intended to include all modifications falling within the scope of the following claims.

I claim:

1. A system for translating input signals representing a binary number into output signals representing a binary-coded decimal output number, said system comprising: a register; first means for comparing binary 101 with the three most significant binary digits of a series of signals in said register; second means for subtracting binary 101 from said input signals and shifting the result one binary position in increasing significance in said register when the three most significant signals thereof are equal to or greater than binary 101; third means for shifting said input signals one binary position in increasing significance for storage in said register without subtraction when the three most significant binary digits of said input signals are less than binary 101; and fourth means for successively comparing binary 101 with the remainder in said register and performing subtractions and simultaneous shifting in said register when the three most significant binary digits of said remainder are equal to or greater than binary 101 and for shifting said remainder without subtraction when the remainder is less than binary 101.

2. A system for converting a binary number into a binary coded decimal number, the binary number being represented by input signals and the binary coded decimal number being represented by output signals, comprising: a register having stages, one for storing each of the input signals; first means responsive to the signals of the three most significant stages of said register to generate first and second signals indicative of their decimal value, the first signal characterizing a value within the group 0 through 4 and the second signal characterizing a value within the group 5 through 9; a first shift network responsive to the first signal generated by said first means to shift the signals in said register one stage in increasing significance; a subtract-shift network responsive to the second signal generated by said first means to reduce the signals in the three most significant stages of said register by decimal 5 while shifting the resulting signals and the other signals in said register one stage in increasing significance; second means responsive to the signals generated by said first means to enter a signal into the least significant stage of said register, the entered signal comprising a binary 0 signal when the first signal is generated and a binary 1 signal when the second signal is generated; third means responsive to said first and second means, subtract-shift network and first shift network to generate the output signal upon operation thereof a number of times corresponding to the number of stages in said register; and a second shift network responsive to the output signal to shift the signals in said register three stages in increasing significance.

3. A system for translating a binary number comprised of a plurality of binary digits, each represented by an input signal, into output signals representing digits of a binary coded decimal number, said system comprising: a storage register having a plurality of stages equal to the number of digits in said binary number plus one for storing said input signals with the signals representing the least and most significant bits of said binary number being respectively stored in the least significant and the next to most significant stages of said register; first means for comparing signals representing binary 101 with the signals stored in the four most significant stages of said register; second means for subtracting binary 101 from the binary number in said four most significant stages and shifting the remaining contents of said register one binary position in increasing significance when the number in said four most significant stages is equal to greater than binary 101; third means for shifting the contents of said register one binary position in increasing significance without subtraction when the number in said four most significant stages is less than binary 101; and fourth means for successively comparing said signals representing binary 101 with the number in the four most significant stages and performing subtractions and simultaneous shifting when the number in said four most significant stages is equal to or greater than 101 and for shifting the contents of said register without subtraction when the number in said four most significant stages is less than binary 101.

4. The combination of claim 3 including a second register; and fifth means for transferring to said second register the difference resulting from the last subtraction after a predetermined number of shifts of said first register equal to the number of digits in said binary number minus three.

5. The combination of claim 3 including sixth means for entering a binary one in the least significant stage of said register while said second means shifts the contents of said register and for entering a binary zero in the least significant stage of said register while said third means shifts the contents of said register.

References Cited in the file of this patent

UNITED STATES PATENTS 2,929,556 Hawkins et al. ---------- Mar. 22, 1960

UNITED STATES PATENT OFFICE

CERTIFICATE OF CORRECTION

Patent No. 3,082,950 March 26, 1963

James D. Hogan

It is hereby certified that error appears in the above numbered patent requiring correction and that the said Letters Patent should read as corrected below.

Column 7, line 16, for "$B_{10}$", first occurrence only, read -- $B_{10}'$ --; line 58, for "folow" read -- follow --; column 8, line 55, for "$P_9'$" read -- $B_9'$ --; line 56, for "$P_8$" read -- $B_8$ --.

Signed and sealed this 15th day of September 1964.

(SEAL)
Attest:

ERNEST W. SWIDER
Attesting Officer

EDWARD J. BRENNER
Commissioner of Patents